No. 680,169. Patented Aug. 6, 1901.
J. NORTHROP.
FILLING REPLENISHING MECHANISM FOR LOOMS.
(Application filed May 2, 1901.)
(No Model.)
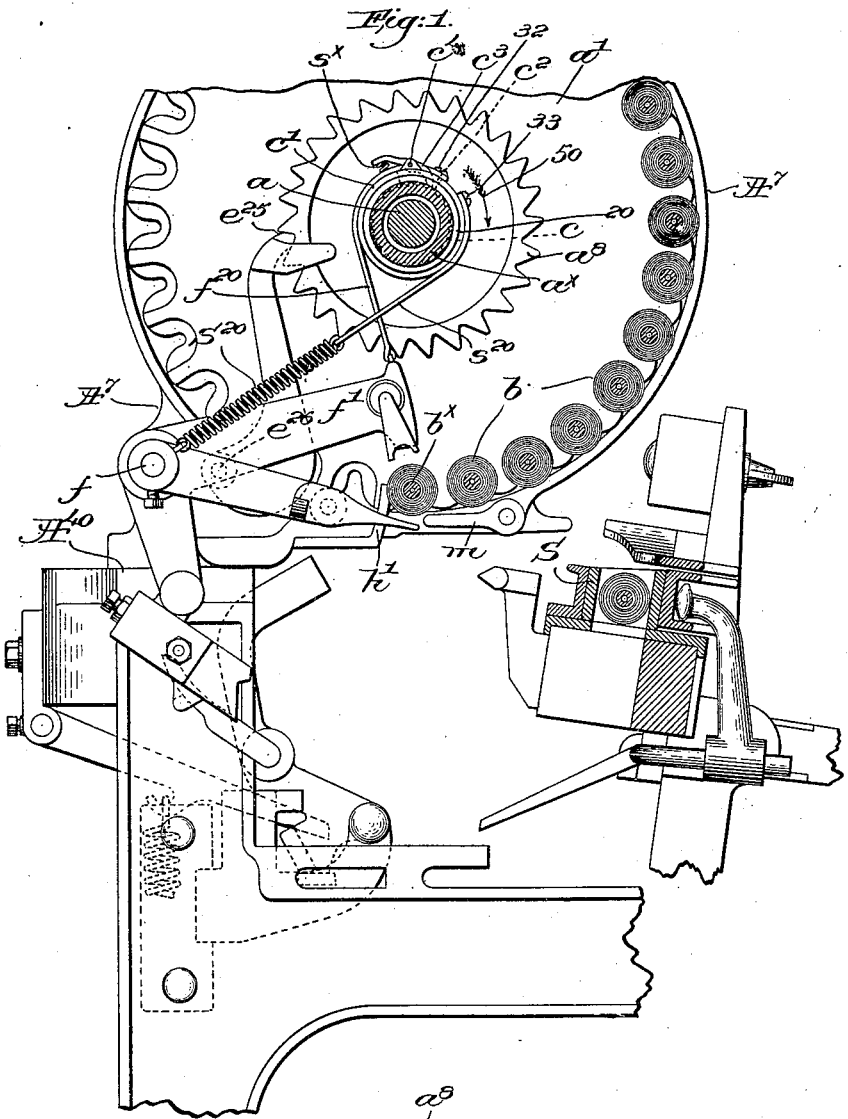
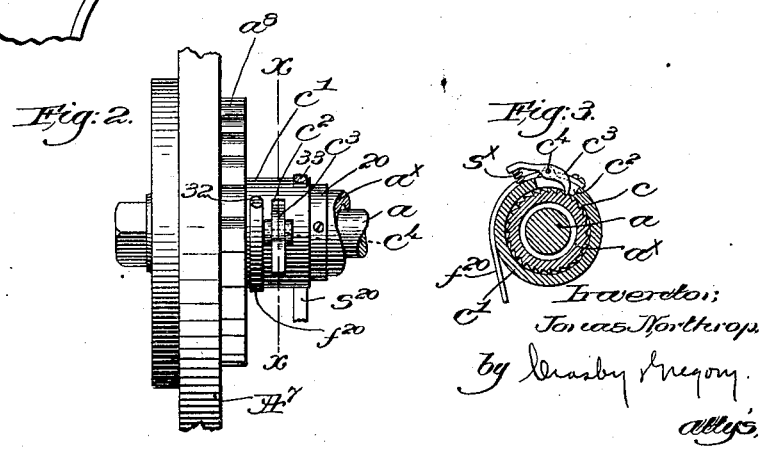
Witnesses,
Edward F. Allen.
Adolph F. Kaiser.
Inventor:
Jonas Northrop,
by Crosby & Gregory
attys.

United States Patent Office.

JONAS NORTHROP, OF HOPEDALE, MASSACHUSETTS, ASSIGNOR TO DRAPER COMPANY, OF SAME PLACE AND PORTLAND, MAINE.

FILLING-REPLENISHING MECHANISM FOR LOOMS.

SPECIFICATION forming part of Letters Patent No. 680,169, dated August 6, 1901.

Application filed May 2, 1901. Serial No. 58,479. (No model.)

*To all whom it may concern:*

Be it known that I, JONAS NORTHROP, a subject of the King of Great Britain, residing at Hopedale, in the county of Worcester and State of Massachusetts, have invented an Improvement in Filling-Replenishing Mechanism for Looms, of which the following description, in connection with the accompanying drawings, is a specification, like letters and figures on the drawings representing like parts.

This invention relates to that type of automatic filling-replenishing mechanism for looms wherein a plurality of filling-carriers, each containing a supply of filling, are mounted in a rotatable feeder or hopper which is intermittingly rotated to bring the filling-carriers one by one into position to be engaged and removed at the proper time by a transferrer and placed in the shuttle. Mechanism of this type is shown and described in United States Patent No. 529,940, dated November 27, 1894, to which reference may be had.

My present invention has for its particular object the production of novel means for imparting rotative movement to the filling-feeder, such movement being governed by or through the operation of the transferrer.

Figure 1 is a transverse section of a portion of a loom with one embodiment of my invention applied thereto, the section being taken to the axis of and between the end plates of disks which substantially constitute the filling-feeder. Fig. 2 is an enlarged front elevation showing the clutch device for actuating the filling-feeder; and Fig. 3 is a sectional detail on the line $x\,x$, Fig. 2.

The stand $A^7$, mounted on the breast-beam $A^{40}$, near one end thereof, and having a fixed stud $a$ extended parallel to the breast-beam, the filling-feeder rotatably mounted on the stud and comprising two parallel disks, only one of which, as $a'$, is herein shown, to support the filling-carriers $b$, the hub $a^\times$, connecting the disks, the transferrer $f'$, fulcrumed on a fixed stud $f$, and the means for operating the transferrer to engage and remove the filling-carriers one by one from the feeder to the shuttle S may be and are all substantially as shown and described in United States Patent No. 664,790, dated December 25, 1900. The toothed wheel $a^8$ on the disk $a'$, the coöperating detent-pawl $e^{25}$, pivotally mounted at $e^{26}$ on the stand $A^7$, the stop $h'$ for the endmost filling-carrier $b^\times$ of the series in the feeder, and the finger $m$ are also as in said patent and operate as therein set forth.

I have herein shown a clutch device for effecting rotation of the feeder, said clutch comprising a ratchet-like member $c$, rotatable with the feeder and herein formed by making a series of ratchet-teeth in the hub $a^\times$, while the coöperating or loose member of the clutch is shown as a sleeve $c'$ or pawl-carrier surrounding the ratchet $c$ and loosely mounted on the hub $a^\times$ between the toothed wheel $a^8$ and a collar 20, secured to the hub. (See Fig. 2.)

The pawl-carrier has an opening $c^2$ therein through which the end of the pawl $c^3$ enters to engage the ratchet $c$, as shown in Fig. 3, said pawl being fulcrumed at $c^4$ on the pawl-carrier and kept in engagement with the ratchet $c'$ by a spring $s^\times$.

The pawl and ratchet are so arranged that when the pawl-carrier is moved forward in the direction of arrow 50, Fig. 1, the feeder will be rotated in the same direction to bring the next filling-carrier of the series into position to be transferred when the transferrer is again operated.

I have herein shown two oppositely-extended flexible bands or straps $f^{20}\,s^{20}$, fixedly secured to the pawl-carrier at 32 33, and the free end of the band $f^{20}$ is attached to the transferrer, so that when the latter is moved down from the position shown in Fig. 1 to remove the filling-carrier $b^\times$, which is in operative position, the pawl-carrier $c'$ will be retracted or rotated oppositely to arrow 50 to set it, the pawl taking a new hold on the ratchet. This setting movement is opposed by the resistance of a spring $S^{20}$, which is fixed at one end and at its other end attached to the free end of the band $s^{20}$, so that when the pawl-carrier is retracted the spring $S^{20}$ is stretched. As the transferrer returns to normal position the spring contracts and pulls the pawl-carrier forward, to thereby turn the ratchet $c$ and feeder in the direction of arrow 50 to bring the next filling-carrier into the path of the transferrer, movement of the feeder being terminated by engagement of such endmost filling-carrier with the stop $h'$.

Should there be one or more filling-carriers absent from the feeder, the impetus imparted to the feeder by or through the contraction of the spring $S^{20}$ will be sufficient to continue the rotative movement of the feeder until the gap is passed and the next filling-carrier engages the stop $h'$.

Various changes or modifications may be made in the construction and arrangement of parts herein shown and described without departing from the spirit and scope of my invention, one practical embodiment of which forms the subject-matter of this specification and the subjoined claims.

Having described the invention, what I claim, and desire to secure by Letters Patent, is—

1. A rotatable filling-feeder to hold a series of filling-carriers, a transferrer to engage and remove the latter one by one, a clutch to rotate the feeder, means governed by operative movement of the transferrer to set the clutch, and independent means to actuate the clutch and rotate the feeder when the transferrer returns to normal position.

2. A rotatable filling-feeder to hold a series of filling-carriers, a transferrer to engage and remove the latter one by one, a clutch mounted coaxially with and to rotate the feeder intermittingly, means governed by operative movement of the transferrer to set the clutch, and independent means to actuate the clutch and rotate the feeder when the transferrer returns to normal position.

3. A rotatable filling-feeder to hold a series of filling-carriers, a transferrer to engage and remove the latter one by one, a clutch member rotatable with the feeder, a coöperating loose clutch member, a connection between the latter and the transferrer, to set the loose member when the transferrer operates, and a spring-actuator to effect forward rotative movement of the clutch members, and thereby to rotate the feeder, when the transferrer returns to normal position.

4. A rotatable filling-feeder having an attached ratchet, a coöperating pawl, an oscillating pawl-carrier coaxial with the feeder, a transferrer, means actuated by operation of the transferrer to retract the pawl-carrier and set the pawl, and independent means to move the pawl-carrier forward to rotate the filling-feeder when the transferrer returns to normal position.

5. A rotatable filling-feeder having an attached ratchet, a coöperating pawl, an oscillating pawl-carrier coaxial with the feeder, a transferrer, a flexible connection between the pawl-carrier and the transferrer, to retract the former when the transferrer operates, and an actuating-spring connected with the pawl-carrier to move it forward and thereby rotate the filling-feeder when the transferrer returns to normal position.

6. A rotatable filling-feeder having an attached ratchet, a coöperating pawl, an oscillating pawl-carrier coaxial with the feeder, a transferrer, two oppositely-extended flexible bands attached to the pawl-carrier, one of said bands being secured at its free end to the transferrer, to retract or set the pawl-carrier when the transferrer operates, and a spring fixedly secured at one end and at its other end connected with the free end of the other band, to move the pawl-carrier forward when the transferrer returns to normal position.

In testimony whereof I have signed my name to this specification in the presence of two subscribing witnesses.

JONAS NORTHROP.

Witnesses:
GEORGE OTIS DRAPER,
ERNEST W. WOOD.